(12) United States Patent
Willard (10) Patent No.: US 9,845,215 B1
(45) Date of Patent: Dec. 19, 2017

(54) COVE BASE ROLL DOLLY

(71) Applicant: Steven Willard, Asheville, NC (US)

(72) Inventor: Steven Willard, Asheville, NC (US)

(*) Notice: Subject to any disclaimer, the term of this patent is extended or adjusted under 35 U.S.C. 154(b) by 0 days.

(21) Appl. No.: 15/437,805

(22) Filed: Feb. 21, 2017

(51) Int. Cl.
*B65H 16/02* (2006.01)
*B65H 16/00* (2006.01)
*B62B 3/10* (2006.01)
*E04F 21/00* (2006.01)

(52) U.S. Cl.
CPC ............ *B65H 16/00* (2013.01); *B62B 3/104* (2013.01); *E04F 21/0053* (2013.01); *B62B 2203/071* (2013.01); *B62B 2301/25* (2013.01)

(58) Field of Classification Search
CPC ........ B62B 3/104; B65H 49/00; B65H 16/02; B65H 16/04
See application file for complete search history.

(56) References Cited

U.S. PATENT DOCUMENTS

| | | |
|---|---|---|
| 3,995,758 A | 12/1976 | Kovaleski |
| 4,447,012 A | 5/1984 | Woodruff |
| 4,705,283 A | 11/1987 | Kleisath |
| D328,378 S | 7/1992 | Hargrove |
| 5,158,243 A | 10/1992 | Sigle |
| 5,580,205 A | 12/1996 | Frystak |
| 7,350,741 B1 * | 4/2008 | Rosa .................... B65H 75/265 242/403 |
| 7,398,979 B2 | 7/2008 | Chen |
| 8,727,361 B2 | 5/2014 | Jordan |

FOREIGN PATENT DOCUMENTS

WO   2012158485 A1   2/2014

* cited by examiner

*Primary Examiner* — John Walters
*Assistant Examiner* — James Triggs
(74) *Attorney, Agent, or Firm* — Kyle A. Fletcher, Esq.

(57) ABSTRACT

The cove base roll dolly is adapted for use in transporting objects. The cove base roll dolly is adapted for use in the transporting of cove base rolls. The cove base roll is further defined with as a spool of material loaded on the drum of a spool. The cove base roll is adapted for use in the distribution of the cove base. Wherein the cove base roll is distributed by unrolling the material off the spool. The cove base roll dolly receives the cove base roll for use in the distribution of the cove base off the cove base roll. The cove base roll dolly is a wheeled device. The cove base roll dolly further comprises a transport base, a slew bearing, a turntable, and a plurality of casters.

17 Claims, 6 Drawing Sheets

COVE BASE ROLL DOLLY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of conveying, packing, storing and handling thin or filamentary materials, more specifically, a rigid or semi-rigid conveyance not otherwise provided for.

SUMMARY OF INVENTION

The cove base roll dolly is adapted for use in transporting objects. The cove base roll dolly is adapted for use in the transporting of cove base rolls. The cove base roll is further defined with as a spool of material loaded on the drum of a spool. The cove base roll is adapted for use in the distribution of the cove base. Wherein the cove base roll is distributed by unrolling the material off the spool. The cove base roll dolly receives the cove base roll for use in the distribution of the cove base off the cove base roll. The cove base roll dolly is a wheeled device.

These together with additional objects, features and advantages of the cove base roll dolly will be readily apparent to those of ordinary skill in the art upon reading the following detailed description of the presently preferred, but nonetheless illustrative, embodiments when taken in conjunction with the accompanying drawings.

In this respect, before explaining the current embodiments of the cove base roll dolly in detail, it is to be understood that the cove base roll dolly is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cove base roll dolly.

It is therefore important that the claims be regarded as including such equivalent construction insofar as they do not depart from the spirit and scope of the cove base roll dolly. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The cove base roll dolly 100 (hereinafter invention) is a wheeled device. The invention 100 further comprises a transport base 101, a slewing bearing 102, a turntable 103, and a plurality of casters 104. The transport base 101 attaches to the slewing bearing 102. The slewing bearing 102 attaches to the turntable 103. The plurality of casters 104 attaches to the transport base 101. The invention 100 is adapted for use in transporting objects. The invention 100 is adapted for use in the transporting of cove base 130 roll 131. The cove base 130 roll 131 is further defined with as a spool 133 of material loaded on the drum of a spool 133. The cove base 130 roll 131 is adapted for use in the distribution of the cove base 130. Wherein the cove base 130 roll 131 is distributed by unrolling the cove base 130 off the spool 133. The invention 100 receives the cove base 130 roll 131 for use in the distribution of the cove base 130 off the cove base 130 roll 131.

Figure 1:
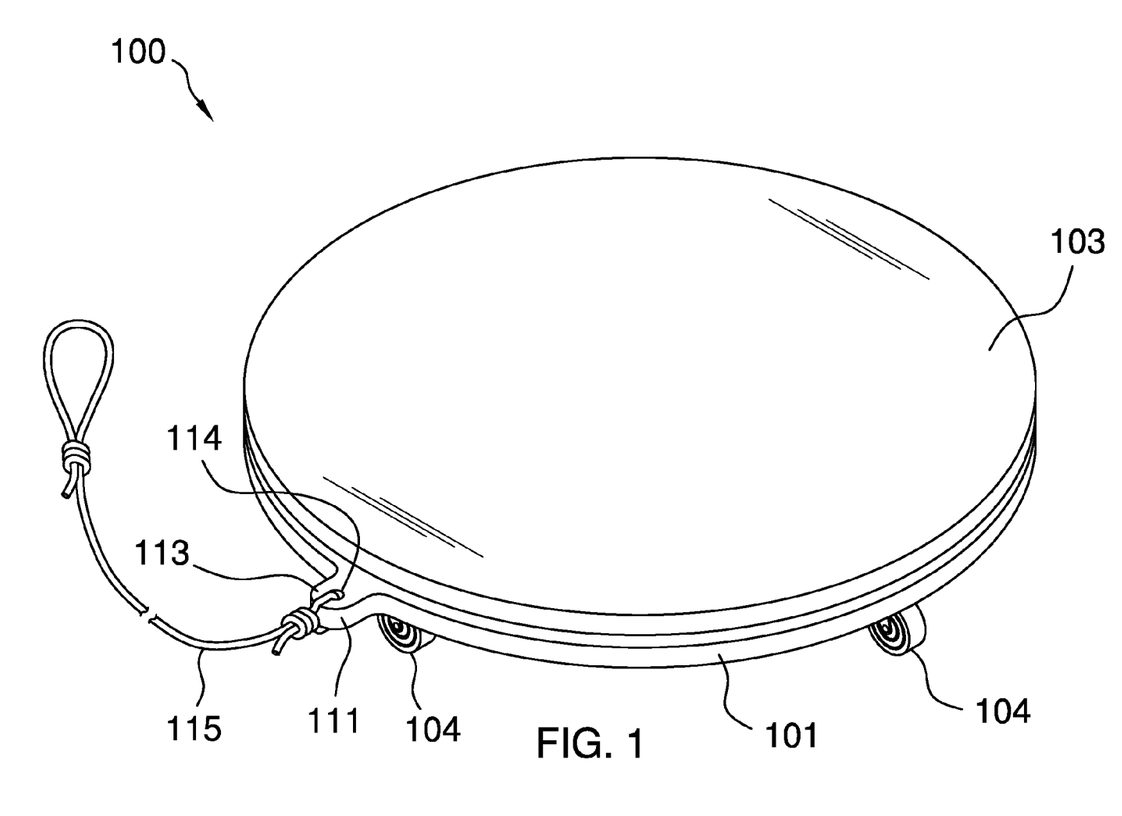
FIG. 1 is a perspective view of an embodiment of the disclosure.
Figure 2:
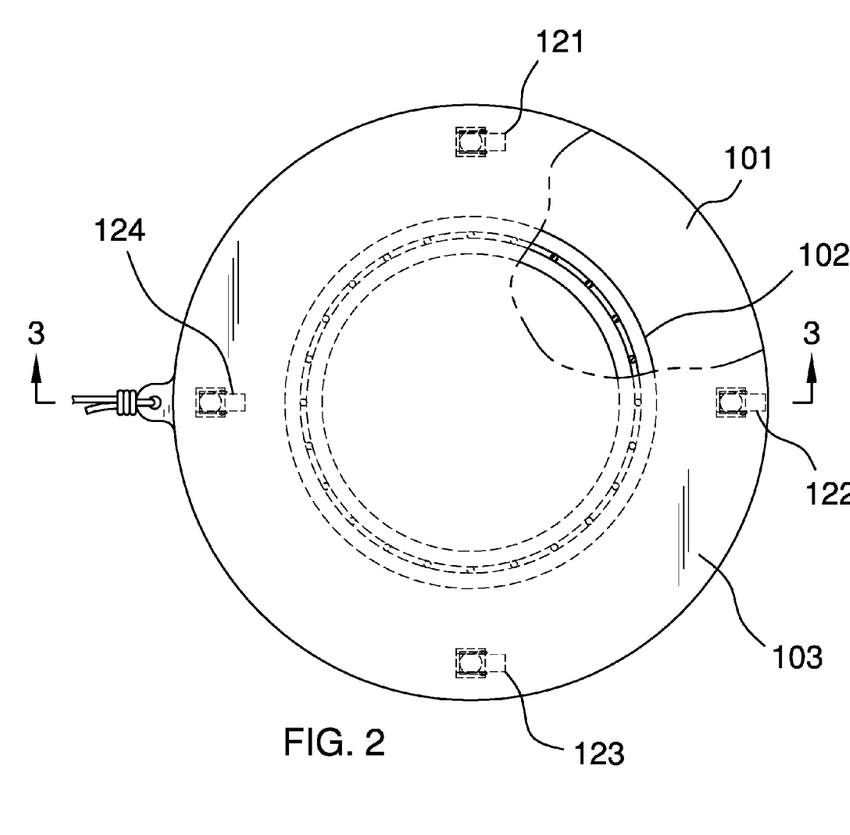
FIG. 2 is a top view of an embodiment of the disclosure.
Figure 3:
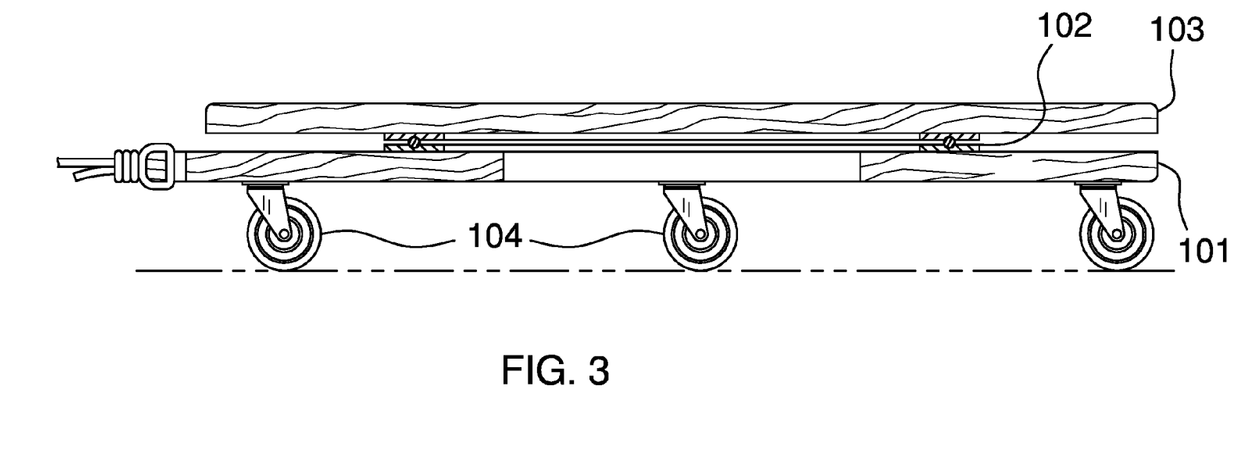
FIG. 3 is a cross-sectional view of an embodiment of the disclosure across 3-3 as shown in FIG. 2.
Figure 4:
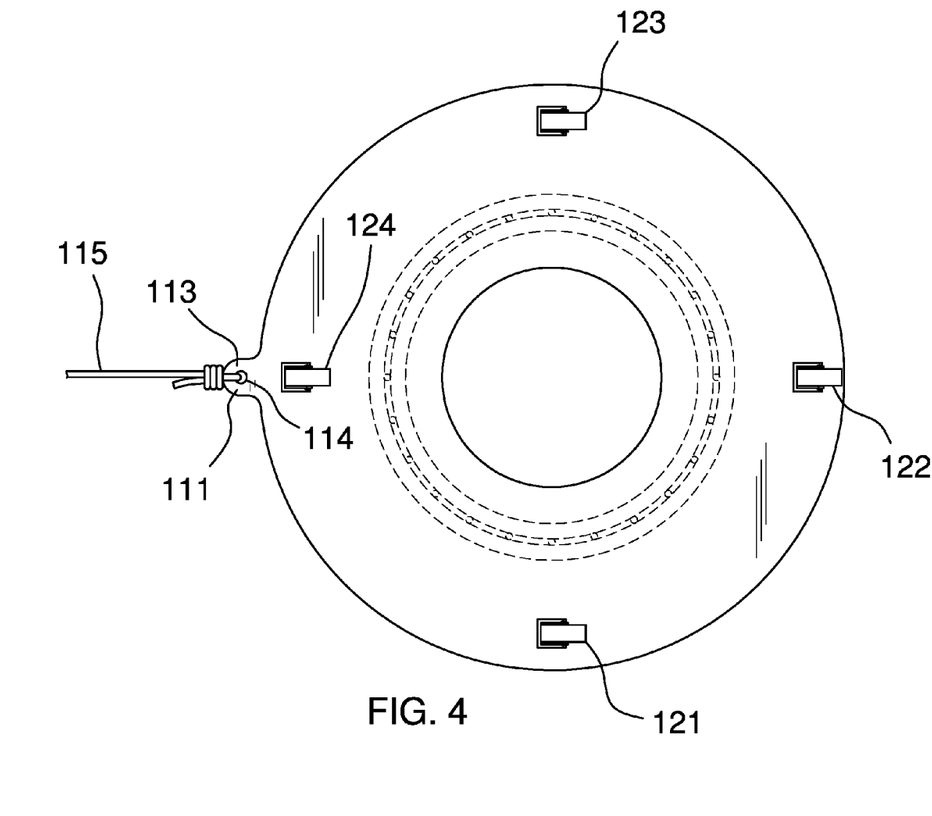
FIG. 4 is a bottom view of an embodiment of the disclosure.
Figure 5:
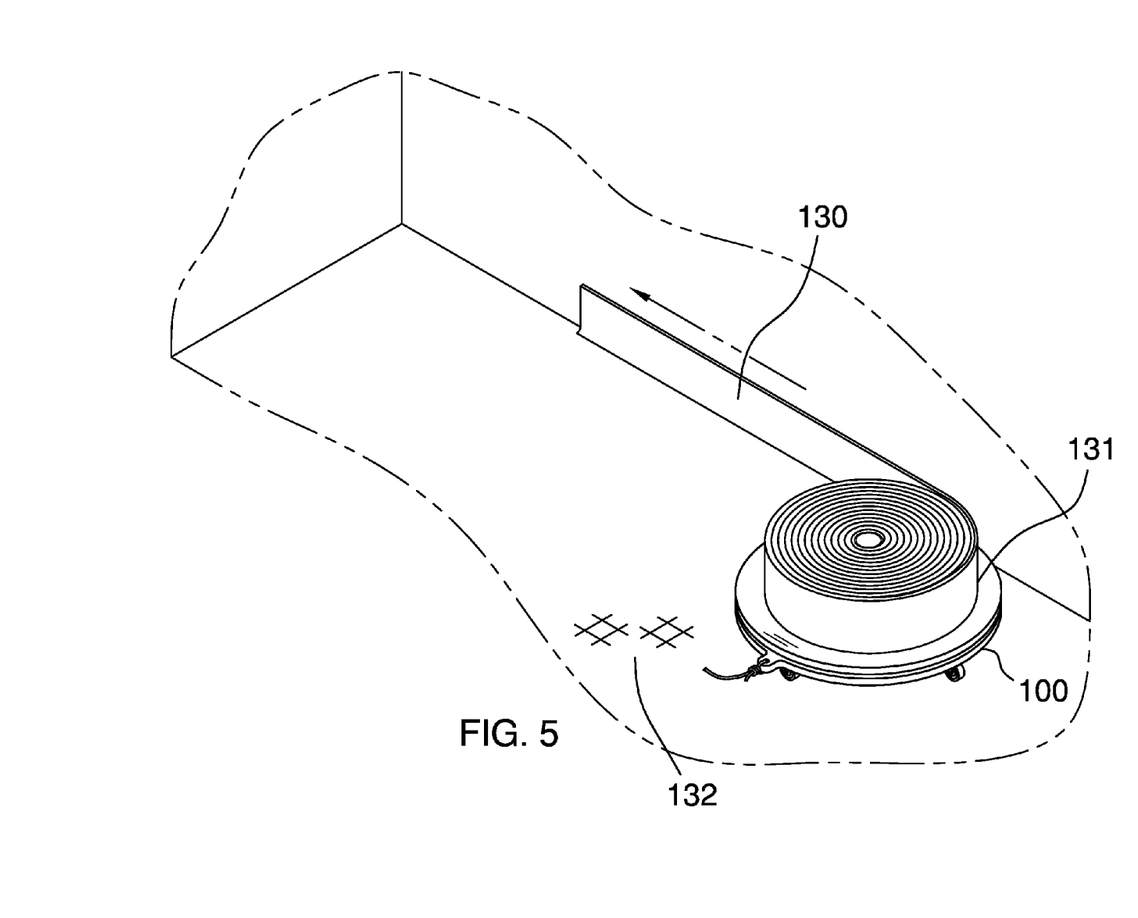
FIG. 5 is an in use view of an embodiment of the disclosure.
Figure 6:
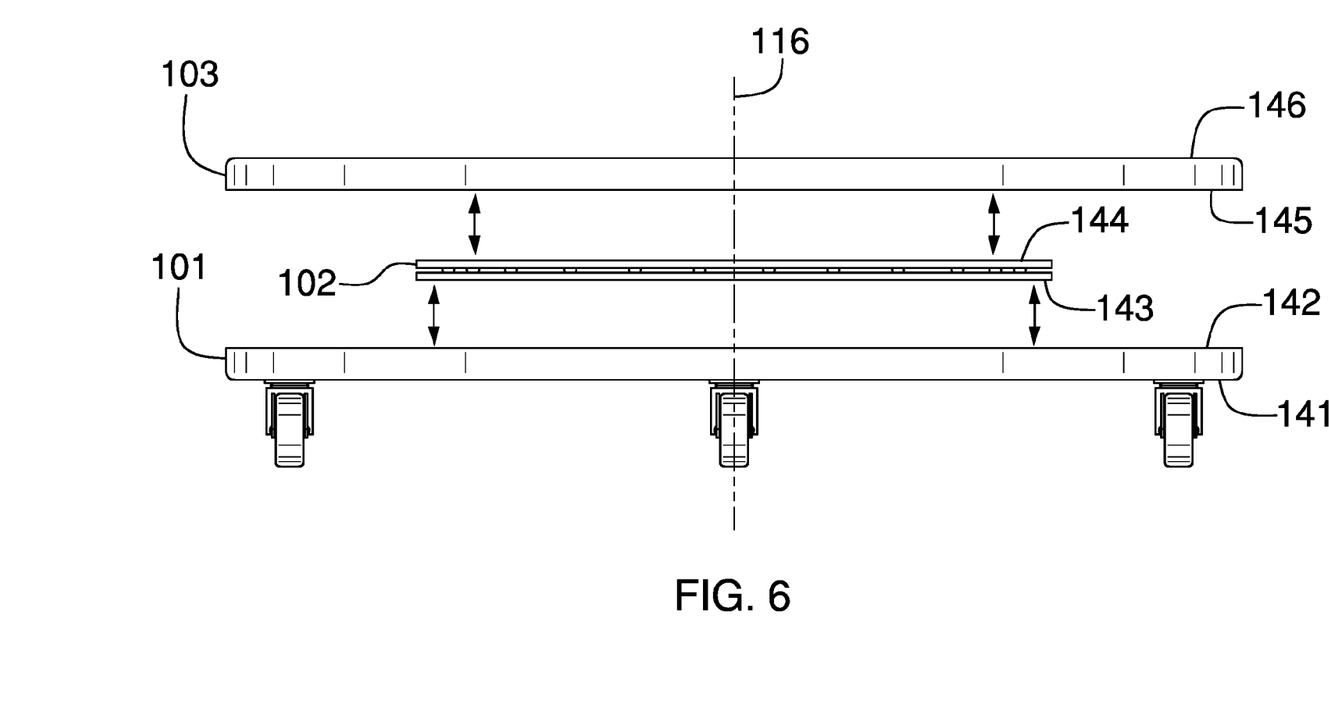
FIG. 6 is an exploded view of an embodiment of the disclosure.

As shown most clearly in FIGS. 1, 2, and 4, the transport base 101 is a first circular disk structure formed from a plate material. The transport base 101 is further defined with a first surface 141 and a second surface 142. The second surface 142 of the transport base 101 is distal from the first surface 141. As shown most clearly in FIG. 4, the transport base 101 further comprises an anchor point 111. The circumference of the transport base 101 contains the anchor point 111. The purpose of the anchor point 111 is to provide a location to which a cord 115 may be anchored. The cord 115 is used to pull the invention 100 during use. The anchor point 111 comprises a tab 113 and an aperture 114. The tab 113 is a structure that projects away from the circumference of the transport base 101 in a direction away from the center of the transport base 101. The aperture 114 is a hole formed within the tab 113 through which the cord 115 can be threaded for attachment to the anchor point 111. Each of the plurality of casters 104 are identical. Each of the plurality of casters 104 are mounted on the first surface 141 of the transport base 101 such that when the plurality of casters 104 are placed on a supporting surface 132 the invention 100 will freely roll on the supporting surface 132.

The slewing bearing 102 is a readily and commercially available slewing bearing 102 assembly. The slewing bearing 102 is used to attach the transport base 101 to the turntable 103. The slewing bearing 102 is further defined with a third surface 143 and a fourth surface 144. The fourth surface 144 of the slewing bearing 102 is distal from the third surface 143. Methods to select and install slewing bearings 102 are well known and documented in the mechanical arts.

The turntable 103 is a second circular disk structure formed from a plate material. The turntable 103 is further defined with a fifth surface 145 and a sixth surface 146. The sixth surface 146 of the turntable 103 is distal from the fifth surface 145.

To assemble the invention 100, the second surface 142 of the transport base 101 is attached to the third surface 143 of the slewing bearing 102 such that the center axis of the transport base 101 and the center axis of the slewing bearing 102 are aligned such that: 1) a master center axis 116 is formed; 2) the master center axis 116 passes through the center of the second surface 142; 3) the master center axis 116 passes through the center of the third surface; 4) the master center axis 116 is perpendicular to the second surface 142; and, 5) the master center axis 116 is perpendicular to the third surface 143. The fourth surface 144 of the slewing bearing 102 is attached to the fifth surface 145 of the turntable 103 such that: 1) the center axis of the turntable 103 is aligned with and becomes a part of the master center axis 116; 2) the master center axis 116 passes through the center of the fourth surface 144; 3) the master center axis 116 passes through the center of the fifth surface 145; 4) the master center axis 116 is perpendicular to the fourth surface 144; and, 5) the master center axis 116 is perpendicular to the fifth surface 145.

In the first potential embodiment of the disclosure, the plurality of casters comprises a first caster 121, a second caster 122, a third caster 123, and a fourth caster 124.

To use the invention 100, the cove base 130 roll 131 is placed turntable 103. To remove the cove base 130 roll 131, the cove base 130 is rolled off the cove base 130 roll 131.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Caster: As used in this disclosure, a caster is a wheel that is mounted on a swivel that allows the wheel to adjust, or swivel, the direction of rotation of the wheel to the direction of motion desired for the wheel.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Center of Rotation: As used in this disclosure, the center of rotation is the point of a rotating plane that does not move with the rotation of the plane. A line within a rotating three dimensional object that does not move with the rotation of the object is referred to as an axis of rotation.

Cord: As used in this disclosure, a cord is a long, thin, and flexible piece of string, line, or rope. Cords are made from yarns, piles, or strands of material that are braided or twisted together or from a monofilament (such as fishing line). Cords have tensile strength but are too flexible to provide compressive strength and are not suitable for use in pushing objects.

Cove Base: As used in this disclosure, a cove base is a sacrificial trim or molding that is installed along the base of an interior wall of a building for the purpose of protecting the base of interior form items sliding along the floor.

Cylinder: As used in this disclosure, a cylinder is a geometric structure defined by two identical flat and parallel ends, also commonly referred to as bases, which are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder, which is defined as a cylinder wherein the curved surface perpendicularly intersects with the two identical flat and parallel ends.

Diameter: As used in this disclosure, a diameter of an object is a straight line segment that passes through the center of an object. The line segment of the diameter is terminated at the perimeter or boundary of the object through which the line segment of the diameter runs.

Disk: As used in this disclosure, a disk is a cylindrically shaped object that is flat in appearance.

Dolly: As used in this disclosure, a dolly refers to a mobile platform, generally mounted on casters, that is used to move a load or an object.

Drum: Refers to a right circular cylinder or spool shaped object. The diameter of the drum refers to distance across the circular face of the drum. The circumference of the drum refers to the distance around the edge of the circular face of the drum. The length of the drum refers to the distance between the circular faces of the drum.

Perimeter: As used in this disclosure, a perimeter is one or more curved or straight lines that binds an enclosed area on a plane or surface. The perimeter of a circle is commonly referred to as a circumference.

Plate: As used in this disclosure, a plate is a smooth, flat and rigid object that has at least one dimension that: 1) is of uniform thickness; and 2) that appears thin relative to the other dimensions of the object.

Slew: As used in this disclosure, to slew means to turn or rotate an object around a fixed point or axis.

Slewing Bearing: As used in this disclosure, a slewing bearing is a device that is used to rotate an object on a horizontal surface. Slewing bearings are often called turntable bearings or a lazy Susan bearing.

Spool: As used in this disclosure, a spool is a cylindrical device upon which a flexible material, including but not limited to a yarn, a cord, or a tape, can be wound. Depending on context, a spool may also contain the flexible material stored upon the spool.

Strip: As used in this disclosure, the term describes a long thin object of uniform width. Strips are often rectangular blocks in shape.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A conveyance comprising:
   a wheeled device;
   wherein the conveyance further comprises a transport base, a slewing bearing, a turntable, and a plurality of casters;
   wherein the transport base attaches to the slewing bearing;
   wherein the slewing bearing attaches to the turntable;
   wherein the plurality of casters attaches to the transport base;
   wherein the conveyance is adapted for use in transporting objects;
   wherein the conveyance is adapted for use in the transporting of a cove base roll;
   wherein the cove base roll is further defined with as a spool of material;
   wherein the cove base roll is adapted for use in the distribution of the cove base;
   wherein the cove base roll is distributed by unrolling the cove base of the spool;
   wherein the conveyance receives the cove base roll for use in the distribution of the cove base off the cove base roll.

2. The conveyance according to claim 1
   wherein the transport base is a first circular disk structure formed from a plate material;
   wherein the transport base is further defined with a first surface and a second surface;
   wherein the second surface of the transport base is distal from the first surface.

3. The conveyance according to claim 2
   wherein the transport base further comprises an anchor point;
   wherein the circumference of the transport base contains the anchor point.

4. The conveyance according to claim 3
   wherein the anchor point comprises a tab and an aperture;
   wherein the tab is a structure that projects away from the circumference of the transport base in a direction away from the center of the transport base;
   wherein the aperture is a hole formed through the tab.

5. The conveyance according to claim 4
   wherein each of the plurality of casters are identical;
   wherein each of the plurality of casters are mounted on the first surface of the transport base such that when the plurality of casters are placed on a supporting surface the conveyance will freely roll on the supporting surface.

6. The conveyance according to claim 5
   wherein the slewing bearing is a slewing bearing assembly;
   wherein the slewing bearing attaches the transport base to the turntable;
   wherein the slewing bearing is further defined with a third surface and a fourth surface;
   wherein the fourth surface of the slewing bearing is distal from the third surface.

7. The conveyance according to claim 6
   wherein the turntable is a second circular disk structure formed from a plate material;
   wherein the turntable is further defined with a fifth surface and a sixth surface;
   wherein the sixth surface of the turntable is distal from the fifth surface.

8. The conveyance according to claim 7 wherein the wherein the second surface of the transport base is attached to the third surface of the slewing bearing such that the center axis of the transport base and the center axis of the slewing bearing are aligned such that a master center axis is formed.

9. The conveyance according to claim 8
   wherein the master center axis passes through the center of the second surface;
   wherein the master center axis passes through the center of the third surface;
   wherein the master center axis is perpendicular to the second surface;
   wherein the master center axis is perpendicular to the third surface.

10. The conveyance according to claim 9 wherein the fourth surface of the slewing bearing is attached to the fifth surface of the turntable such that the center axis of the turntable is aligned with and becomes a part of the master center axis.

11. The conveyance according to claim 10
    wherein the master center axis passes through the center of the fourth surface;
    wherein the master center axis passes through the center of the fifth surface;
    wherein the master center axis is perpendicular to the fourth surface;
    wherein the master center axis is perpendicular to the fifth surface.

12. The conveyance according to claim 11 wherein the plurality of casters comprises a first caster, a second caster, and a third caster.

13. The conveyance according to claim 12 wherein the plurality of casters comprises a fourth caster.

14. The conveyance according to claim 1
    wherein the transport base further comprises an anchor point;
    wherein the anchor point comprises a tab and an aperture;
    wherein the aperture is a hole formed through the tab;

wherein each of the plurality of casters are mounted on the first surface of the transport base such that when the plurality of casters are placed on a supporting surface the conveyance will freely roll on the supporting surface;

wherein the slewing bearing attaches the transport base to the turntable;

wherein the slewing bearing is further defined with a third surface and a fourth surface;

wherein the fourth surface of the slewing bearing is distal from the third surface;

wherein the turntable is further defined with a fifth surface and a sixth surface;

wherein the sixth surface of the turntable is distal from the fifth surface.

15. The conveyance according to claim 14 wherein the wherein the second surface of the transport base is attached to the third surface of the slewing bearing such that the center axis of the transport base and the center axis of the slewing bearing are aligned such that a master center axis is formed;

wherein the master center axis passes through the center of the second surface;

wherein the master center axis passes through the center of the third surface;

wherein the master center axis is perpendicular to the second surface;

wherein the master center axis is perpendicular to the third surface.

16. The conveyance according to claim 15 wherein the fourth surface of the slewing bearing is attached to the fifth surface of the turntable such that the center axis of the turntable is aligned with and becomes a part of the master center axis;

wherein the master center axis passes through the center of the fourth surface;

wherein the master center axis passes through the center of the fifth surface;

wherein the master center axis is perpendicular to the fourth surface wherein the master center axis is perpendicular to the fifth surface.

17. The conveyance according to claim 16 wherein the plurality of casters comprises a first caster, a second caster, a third caster, and a fourth caster.

* * * * *